United States Patent
Choi et al.

(10) Patent No.: US 10,700,470 B2
(45) Date of Patent: *Jun. 30, 2020

(54) CONNECTION DEVICE, MANUFACTURING METHOD OF THE SAME, AND ELECTRONIC DEVICE INCLUDING THE SAME

(71) Applicant: Samsung Electronics Co., Ltd., Gyeonggi-do (KR)

(72) Inventors: Young-Sik Choi, Seoul (KR); Jong-Min Choi, Gyeonggi-do (KR); Woong-Chan Kim, Gyeonggi-do (KR); Dae-Hyeong Park, Gyeonggi-do (KR); Sung-Gun Cho, Gyeonggi-do (KR); Min-Sung Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,642

(22) Filed: May 13, 2019

(65) Prior Publication Data

US 2019/0267751 A1     Aug. 29, 2019

Related U.S. Application Data

(63) Continuation of application No. 15/602,560, filed on May 23, 2017, which is a continuation of application
(Continued)

(30) Foreign Application Priority Data

May 12, 2015   (KR) ........................ 10-2015-0066174

(51) Int. Cl.
*H01R 13/52*   (2006.01)
*H01R 13/66*   (2006.01)
(Continued)

(52) U.S. Cl.
CPC ......... *H01R 13/5202* (2013.01); *H01R 12/71* (2013.01); *H01R 13/5216* (2013.01);
(Continued)

(58) Field of Classification Search
CPC .... H01R 24/58; H01R 13/5202; H01R 13/52; H01R 13/5216; H01R 13/5219;
(Continued)

(56) References Cited

U.S. PATENT DOCUMENTS 6,039,596 A    3/2000   Whiteman, Jr.
8,047,873 B1   11/2011  Wang
(Continued)

FOREIGN PATENT DOCUMENTS

CN    201674041    12/2010
CN    202004242    10/2011
(Continued)

OTHER PUBLICATIONS

Chinese Office Action dated Jan. 30, 2019 issued in counterpart application No. 2016103085157, 37 pages.
(Continued)

*Primary Examiner* — Gary F Paumen
(74) *Attorney, Agent, or Firm* — The Farrell Law Firm, P.C.

(57) ABSTRACT

A connection device and method of manufacturing the same is provided. The connection device includes a housing including a first face, into which a plug is introduced, and a second face, that is formed to be in contact with the first face; a connection hole extending to the inside of the housing from the first face; an opening extending from the first face to the second face to partially expose the connection hole on at least the second face; and a sealing member arranged on an outer peripheral surface of the housing to surround a region where the opening is formed.

20 Claims, 16 Drawing Sheets

Related U.S. Application Data

No. 15/093,900, filed on Apr. 8, 2016, now Pat. No. 9,692,170.

(51) Int. Cl.

| | | |
|---|---|---|
| *H01R 24/58* | (2011.01) | |
| *H04M 1/02* | (2006.01) | |
| *H01R 12/71* | (2011.01) | |
| *H01R 43/20* | (2006.01) | |
| *H01R 43/24* | (2006.01) | |
| *H01R 13/443* | (2006.01) | |
| *H04M 1/18* | (2006.01) | |

(52) U.S. Cl.
CPC ..... *H01R 13/5219* (2013.01); *H01R 13/6658* (2013.01); *H01R 24/58* (2013.01); *H01R 43/205* (2013.01); *H01R 43/24* (2013.01); *H04M 1/0274* (2013.01); *H01R 13/443* (2013.01); *H01R 2201/04* (2013.01); *H01R 2201/06* (2013.01); *H01R 2201/16* (2013.01); *H04M 1/18* (2013.01)

(58) Field of Classification Search
CPC .............. H01R 13/6658; H01R 13/443; H01R 2103/00; H01R 12/71; H01R 43/205; H01R 43/24; H01R 2201/04; H01R 2201/06; H01R 2201/16; H04M 1/0274; H04M 1/18
USPC ................................ 439/668, 587–589, 519
See application file for complete search history.

(56) References Cited

U.S. PATENT DOCUMENTS

| | | | |
|---|---|---|---|
| 9,444,193 | B1 | 9/2016 | Westman |
| 9,692,170 | B2 * | 6/2017 | Choi .................. H01R 13/5202 |
| 10,333,245 | B2 * | 6/2019 | Choi .................. H01R 13/5202 |
| 2011/0195611 | A1 | 8/2011 | Little et al. |
| 2011/0260413 | A1 | 10/2011 | Voltenburg |
| 2013/0023139 | A1 | 1/2013 | Lyda |
| 2013/0183867 | A1 | 7/2013 | Wu et al. |
| 2014/0065890 | A1 | 3/2014 | Cheng et al. |
| 2014/0134073 | A1 | 5/2014 | Fuller |
| 2014/0273617 | A1 | 9/2014 | Cheong et al. |
| 2015/0099385 | A1 | 4/2015 | Ikeya |
| 2015/0155663 | A1 | 6/2015 | Zwartkruis |
| 2015/0295347 | A1 | 10/2015 | Nagata et al. |
| 2015/0357745 | A1 | 12/2015 | Chen |
| 2016/0049755 | A1 | 2/2016 | Ning |

FOREIGN PATENT DOCUMENTS

| | | |
|---|---|---|
| CN | 202564660 | 11/2012 |
| CN | 104051897 | 9/2014 |
| CN | 203836627 | 9/2014 |
| CN | 104362463 | 2/2015 |
| EP | 2 779 319 | 9/2014 |
| WO | WO 2014/038605 | 3/2014 |

OTHER PUBLICATIONS

European Search Report dated Sep. 15, 2016 issued in counterpart application No. 16166771.2-1801, 8 pages.

Fuxiang Xu, "Satellite Structure Design and Analysis," Second Volume, Aug. 31, 2009, 4 pages.

Chinese Office Action dated Apr. 26, 2020 issued in counterpart application No. 201610308515.7, 48 pages.

\* cited by examiner

CONNECTION DEVICE, MANUFACTURING METHOD OF THE SAME, AND ELECTRONIC DEVICE INCLUDING THE SAME

PRIORITY

This application is a Continuation Application of U.S. patent application Ser. No. 15/602,560, filed in the U.S. Patent and Trademark Office (USPTO) on May 23, 2017, which is a Continuation Application of U.S. patent application Ser. No. 15/093,900, filed in the USPTO on Apr. 8, 2016, issued as U.S. Pat. No. 9,692,170 on Jun. 27, 2017, and claims priority under 35 U.S.C. § 119(a) to Korean Patent Application Serial No. 10-2015-0066174, which was filed in the Korean Intellectual Property Office on May 12, 2015, the entire content of each of which is incorporated herein by reference.

BACKGROUND

1. Field of the Disclosure

The present disclosure relates generally to an electronic device, and more particularly, to a connection device that provides a connection to another device, a method of manufacturing the connection device, and an electronic device that includes the connection device.

2. Description of the Related Art

Typically, an electronic device refers to a device that performs a specific function according to a program, such as an electronic scheduler, a portable multimedia reproducer, a mobile communication terminal, a tablet PC, an image/sound device, a desktop/laptop PC, or a vehicular navigation system, as well as a home appliance. For example, such an electronic device may output information stored therein, as sound or an image. As the degree of integration of such an electronic device has increased, and high speed, large capacity wireless communication has become popular, various functions have recently been equipped in a single mobile communication terminal. For example, functions, such as an entertainment function (e.g., a game function), a multimedia function (e.g., a music/video reproducing function), a communication and security function for mobile banking and the like, a schedule management function, and an e-wallet function, are integrated in a single electronic device, in addition to a communication function.

It has become popular to use an electronic device, which is integrated with various functions, for example, networking, and is miniaturized to be conveniently portable as described above. For example, users carry an electronic device and use the electronic device. The electronic device, which is carried by the users as described above, may be exposed to various external environments. For example, the operating environment of the electronic device may change depending on the daily change of weather or the external activities of the users, and the electronic device may be exposed to contamination that is caused by water or foreign matter.

SUMMARY

The present disclosure is made to address at least the above described problems and disadvantages and to provide at least the advantages described below.

Various aspects of the present disclosure provide a structure that is capable of protecting an electronic device from contamination and allow the electronic device to be operated despite the change in operating environment as described above, and to provide a manufacturing method that is capable of implementing the structure.

Various aspects of the present disclosure provide a connection device that is capable of preventing water or foreign matter from infiltrating into the inside of an electronic device from the outside, and to provide a method of manufacturing the connection device and an electronic device that includes the connection device.

Various aspects of the present disclosure provide a connection device that is capable of being miniaturized while providing a dustproof and waterproof function, and to provide a method of manufacturing the connection device and an electronic device that includes the connection device.

In accordance with an aspect of the present disclosure, there is provided a connection device that includes a housing including a first face, into which a plug is introduced, and a second face, that is formed to be in contact with the first face; a connection hole extending to the inside of the housing from the first face; an opening extending from the first face to the second face to partially expose the connection hole on at least the second face; and a sealing member arranged on an outer peripheral surface of the housing to surround a region where the opening is formed.

In accordance with another aspect of the present disclosure, there is provided an electronic device including a connection device. The connection device includes a housing including a first face, into which a plug is introduced, and a second face, that is formed to be in contact with the first face; a connection hole extending to the inside of the housing from the first face; an opening extending from the first face to the second face to partially expose the connection hole on at least the second face; and a sealing member arranged on an outer peripheral surface of the housing to surround a region where the opening is formed.

In accordance with another aspect of the present disclosure, there is provided a method of manufacturing a connection device. The method includes providing a housing that comprises a first face, into which a plug is introduced, a second face that is formed to be in contact with the first face, a connection hole that extends from the first face to an inside of the housing, and an opening that extends from the first face to the second face to partially expose the connection hole on at least the second face; and arranging a sealing member on an outer peripheral surface of the housing to surround a region where the opening is formed.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
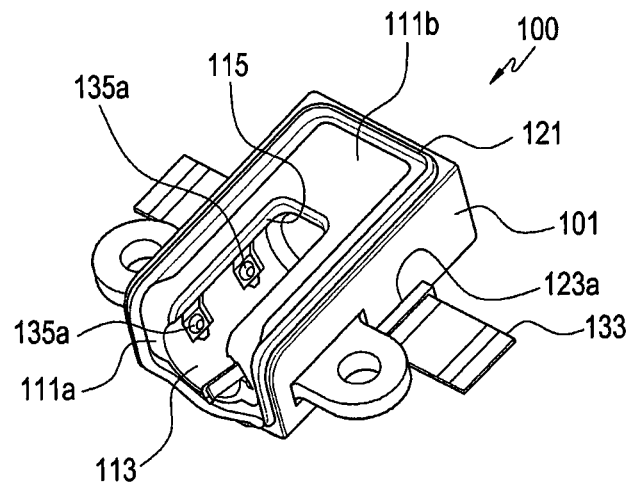
FIG. 1 is a perspective view illustrating a connection device according to an embodiment of the present disclosure.

Hereinafter, various embodiments of the present disclosure will be described with reference to the accompanying drawings. However, it should be understood that there is no limiting the present disclosure to the particular forms disclosed herein, rather, the present disclosure should be construed to cover various modifications, equivalents, and/or alternatives of embodiments of the present disclosure. In describing the drawings, similar reference numerals may be used to designate similar constituent elements.

In the present disclosure, the expressions "A or B", "at least one of A or/and B", or "one or more of A or/and B" may include all possible combinations of the items listed. For example, the expressions "A or B", "at least one of A and B", or "at least one of A or B" refer to all of (1) including at least one A, (2) including at least one B, or (3) including all of at least one A and at least one B.

The expressions "a first", "a second", "the first", or "the second" used in various embodiments of the present disclosure may modify various components regardless of the order and/or the importance but do not limit the corresponding components. For example, a first user device and a second user device refer to different user devices although both of them are user devices. For example, a first element may be referred to as a second element, and similarly, a second element may be referred to as a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it is understood that when an element (e.g., first element) is referred to as being "directly connected," or "directly coupled" to another elements (second element), there are no element (e.g., third element) interposed between them.

The expression "configured to" used in the present disclosure may be used interchangeably with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may refer to a dedicated processor (e.g. embedded processor) only for performing the corresponding operations or a general-purpose processor (e.g., central processing unit (CPU) or application processor (AP)) that may perform the corresponding operations by executing one or more software programs stored in a memory device.

In the present disclosure, the terms are used to describe specific embodiments, and do not limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the same meanings as the contextual meanings in the relevant field of art, and are not to be interpreted to have ideal or excessively formal meanings unless clearly defined in the present disclosure. In some cases, even the terms defined in the present disclosure should not be interpreted to exclude embodiments of the present disclosure.

In the present disclosure, an electronic device may be a random device, and the electronic device may be referred to as a terminal, a portable terminal, a mobile terminal, a communication terminal, a portable communication terminal, a portable mobile terminal, a display device and the like.

The electronic device may be a smartphone, a portable phone, a game player, a TV, a display unit, a heads-up display unit for a vehicle, a notebook computer, a laptop computer, a tablet personal computer (PC), a personal media player (PMP), a personal digital assistant (PDA), and the like. The electronic device may be implemented as a portable communication terminal which has a wireless communication function and is pocket size. Further, the electronic device may be a flexible device or a flexible display device.

The electronic device may communicate with an external electronic device, such as a server and the like, or perform an operation through an interworking with an external electronic device. For example, the electronic device may transmit an image photographed by a camera and/or position information detected by a sensor unit to the server through a network. The network may be a mobile or cellular communication network, a local area network (LAN), a wireless local area network (WLAN), a wide area network (WAN), the Internet, a small area network (SAN) and the like, but is not limited thereto.

In describing the specific embodiments of the present disclosure, connection devices of different embodiments will be denoted by reference numerals such as "100," "100*a*," "100*b*," and "100*c*" in order to distinguish the connection devices from each other. However, in a certain embodiment, even if a connection device is denoted only by reference numeral "100," it may designate all the connection devices of respective embodiments to be described below. For example, in the detailed descriptions made with reference to FIGS. 25 to 27, the connection device may be denoted only by the reference numeral "100," which may designate various embodiments of the connection device to be described below.

According to various aspects of the present disclosure, an electronic device that includes the above-described connection device is capable of providing a dustproof and waterproof function since the connection device is accommodated in the inside of a case member and the sealing member forms a sealing structure between the housing and the case member. The sealing member may be simultaneously attached to the outer peripheral surface of the housing when the sealing member is molded through insert injection molding. The sealing member may be manufactured separately from the housing and may be attached to the housing via, for example, an adhesive or tape.

According to various aspects of the present disclosure, the connection device is capable of forming a dustproof and waterproof structure since the sealing member, which is attached to the outer peripheral surface of the housing, is in close contact with the inner peripheral surface of the case member of the electronic device. In implementing such a connection device, the size (e.g., the thickness) of the housing is reduced to such an extent that an opening that outwardly exposes a portion of a connection member (e.g., a plug), which is accommodated in the connection device, and the sealing member is arranged around the opening. Thus, miniaturization of the connection device may be facilitated. As the connection device, which is accommodated in the case member of the electronic device, is miniaturized, freedom of design may be improved on the exterior of the case member of the electronic device. For example, the connection device is capable of contributing to the aesthetics of the exterior of the electronic device while implementing a dustproof and waterproof structure.

Figure 2:
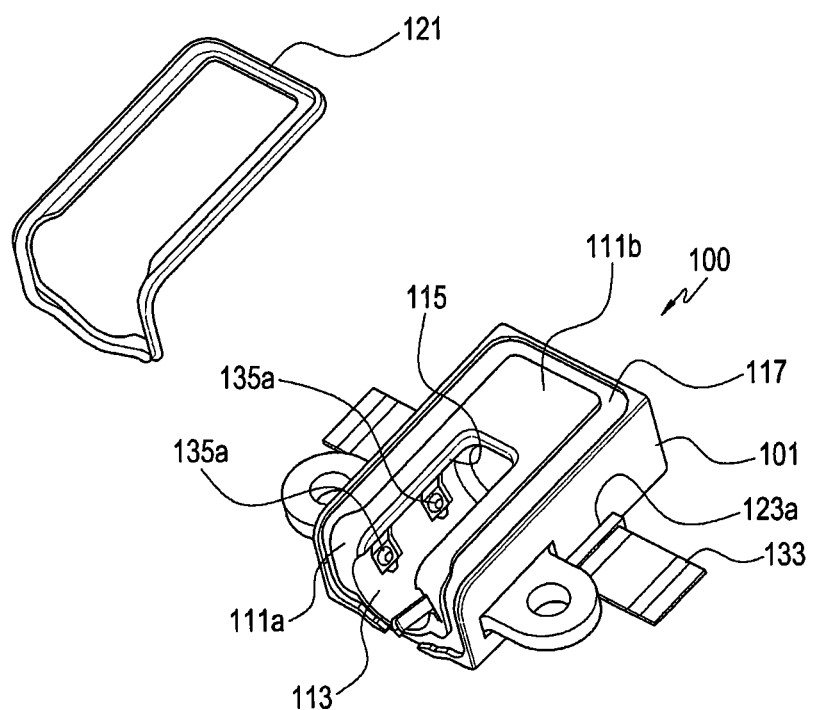
FIG. 2 is a perspective view illustrating the connection device according to an embodiment of the present disclosure in a state where the connection device is partially disassembled.
Figure 3:
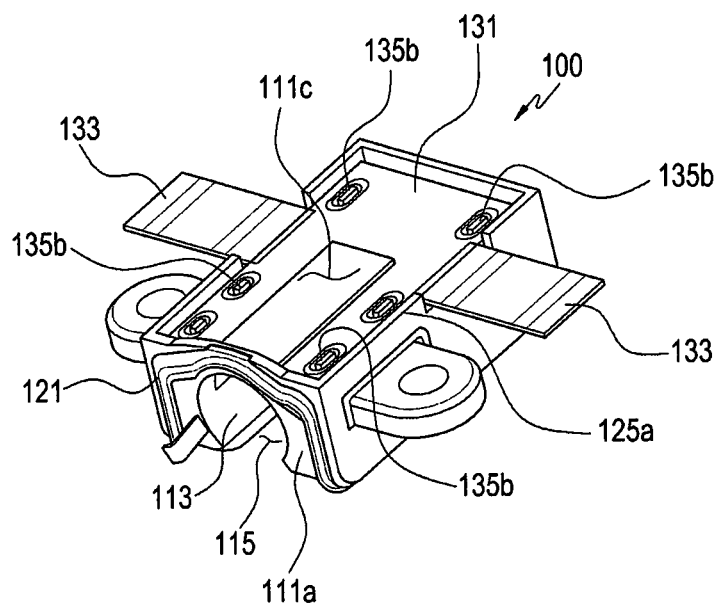
FIG. 3 is a perspective view illustrating the connection device according to an embodiment of the present disclosure, in which a portion of the connection device is viewed from another direction.
Figure 4:
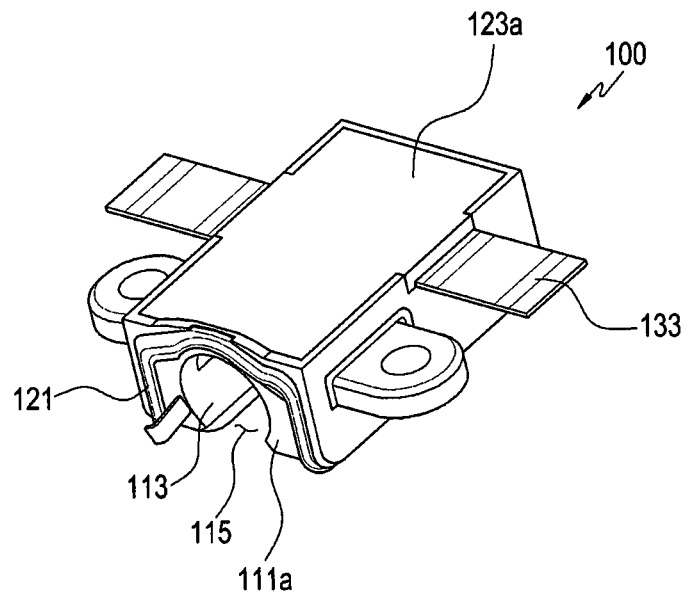
FIG. 4 is a perspective view illustrating the connection device according to an embodiment of the present disclosure, in which the connection device is viewed from another direction.

FIG. 1 is a perspective view illustrating a connection device 100 according to an embodiment of the present disclosure. FIG. 2 is a perspective view illustrating the connection device 100 according to an embodiment of the present disclosure in a state where the connection device is partially disassembled. FIG. 3 is a perspective view illustrating the connection device 100 according to an embodiment of the present disclosure, in which a portion of the connection device is viewed from another direction. FIG. 4 is a perspective view illustrating the connection device 100 according to an embodiment of the present disclosure, in which the connection device is viewed from another direction.

Referring to FIGS. 1 and 2, the connection device 100 includes a housing 101, to which an external connection device (e.g., a plug that is provided at an end of a cable) is accommodated and coupled, and a sealing member 121 that is mounted on the outer peripheral surface of the housing 101.

The housing 101 may include a connection hole 113 that extends from a first face 111*a*. In addition, the housing 101 may include an opening 115 that extends from the first face 111*a* to a second face 111*b* that is in contact with the first face 111*a*. The opening 115 may be connected to the connection hole 113 in the first face 111*a*, and may expose the connection hole 113 to the outside up to at least the second face 111*b*. In the state where an external connection device is inserted into the connection hole 113, a portion of the outer peripheral surface of the external connection device may be exposed through the opening 115, or may protrude from the outer peripheral surface of the housing 101 (e.g., the second face 111*b*). For example, the connection hole 113 may have a structure that allows a portion of the inserted external connection device to protrude to the outside through the opening 115 while accommodating and fixing the inserted external connection device.

The housing 101, which includes the opening 115 as described above, may contribute to the miniaturization of the connection device 100. For example, in the portion that corresponds to the second face 111*b*, the thickness may be reduced between the inner peripheral surface of the connection hole 113 and the outer peripheral surface of the housing 101, and the opening 115 may be formed. As compared to a structure in which the housing 101 completely encloses the periphery of an external connection device, the thickness or height of the connection device 100 (e.g., the housing 101) may be reduced by reducing the thickness between the inner peripheral surface of the connection hole 115 and the outer peripheral surface of the housing 101. The configuration of the above-mentioned connection device will be described in more detail with reference to FIG. 29.

The sealing member 121 is arranged on the outer peripheral surface of the housing 101, and may be made of an elastic material (e.g., rubber, silicon, urethane, and the like). FIG. 2 illustrates the sealing member 121 in the form of being assembled to the housing 101 in the state where the sealing member 121 is manufactured separately from the housing 101. However, the sealing member 121 may be attached and fixed to the outer peripheral surface of the housing 101 at the same time of being molded through, for example, an insert injection molding process. The sealing member 121 may have a closed loop shape, and may be arranged on the outer peripheral surface of the housing 101 to surround a region in which the opening 115 is formed.

The outer peripheral surface of the housing 101 may be subjected to surface treatment (e.g., corrosion treatment) at least along a trace, in which the sealing member 121 is arranged and fixed, so as to strengthen the attaching and fixing force of the sealing member 121. For example, by increasing the surface roughness of the surface, on which the sealing member 121 is formed and attached, so as to increase the contact area between the housing 101 and the sealing member 121, the attaching and fixing force may be improved. A fixing recess 117 may be formed on the outer peripheral surface of the housing 101 so as to provide a space in which the sealing member 121 is formed or attached. The fixing recess 117 may be formed across the first and second faces 111a and 111b, and may form a looped curve that surrounds the region in which the opening 115 is formed. By forming the fixing recess 117 as described above, it is possible to improve the attaching and fixing force of the sealing member 121. In addition, by increasing the surface roughness of the bottom or inner side walls of the fixing recess 117 through surface treatment, such as abrasion, it is possible to further improve the attaching and fixing force between the housing 101 and the sealing member 121.

Referring to FIGS. 3 and 4, the connection device 100 may include a plurality of connection terminals. Each of first ends 135a of the connection terminals may protrude from the inner peripheral surface of the connection hole 113 to be electrically connected to an external connection device that is inserted into the connection hole 113. Each of the second ends 135b of the connection terminals may protrude to the outside of the housing 101. The second ends 135b may be arranged on a third face 111c of the housing 101. For example, the third face 111c may be a face that is in contact with or is opposite to the first face 111a or the second face 111b. This embodiment provides an example in which the third face 111c is arranged to be opposite to the second face 111b while being in contact with the first face 111a. The third face 111c may be positioned to face the first face 111a while being in contact with the second face 111b, or may be positioned to be in contact with each of the first and second faces 111a and 111b. The face, on which the second ends 135b are arranged, may be properly designed in consideration of, for example, the shape of the housing 101, and the position and the structure where the connection device 100 is arranged within the electronic device.

A circuit board 131 may be arranged on the third face 111c of the housing 101. A side wall 125a may be formed on the third face 111c along the peripheral edge of the third face 111c. The side wall 125a may form, on the third face 111c, a space that accommodates the circuit board 131. The circuit board 131 may be formed of a rigid circuit board or a flexible printed circuit board, and a second circuit board 133 may extend from one side edge or opposite side edges of the circuit board 131 across the side wall 125a to protrude to the outside of the housing 101. The second circuit board 133 may provide a means for connecting the circuit board 131 to other circuit devices of the electronic device, and may be a flexible printed circuit board. On the side wall 125a, a wiring recess may be formed by removing a portion of the side wall 125a so as to provide a space, across which the second circuit board 133 is arranged.

When the circuit board 131 is arranged on the third face 111c, each of the second ends 135b of the connection terminals may be positioned on the circuit board 131. The circuit board 131 may be arranged on the third face 111c of the housing 101 through a surface mounting process. In the surface mounting process, each of the second ends 135b may be soldered to a proper position on the circuit board 131.

In the state where the circuit board 131 is arranged, a second sealing member 123a may be arranged on the third face 111c. The second sealing member 123a may block the infiltration of water or foreign matter through a route that is formed in the process of arranging the connection terminals (e.g., the route that is from the first end 135a to the second end 135b). The sealing member 123a may be made of an elastic material that is the same as the sealing member 121. The second sealing member 123a may be formed of a cured resin layer that is obtained by coating and curing a resin, such as epoxy, or may be implemented by attaching a separate sheet. The circuit board 131 itself may also block the route that is formed by arranging the connection terminals. This embodiment exemplifies a structure in which the second sealing member 123a is formed of the cured resin layer.

As described below, the sealing member 121 may block a route, through which water or foreign matter may infiltrate into a gap between the connection device 100 and the case member of the electronic device. For example, in a route where an external connection device reaches the connection hole 113 from the outside of the case member of the electronic device, the sealing member 121 may form a dustproof and waterproof structure between the inner peripheral surface of the case member of the electronic device and the outer peripheral surface of the housing 101. Water or foreign matter may also infiltrate through the connection hole 113. The second sealing member 123a may block the infiltration of water or foreign matter into the inside of the electronic device along the route in which the connection terminals are arranged.

Figure 5:
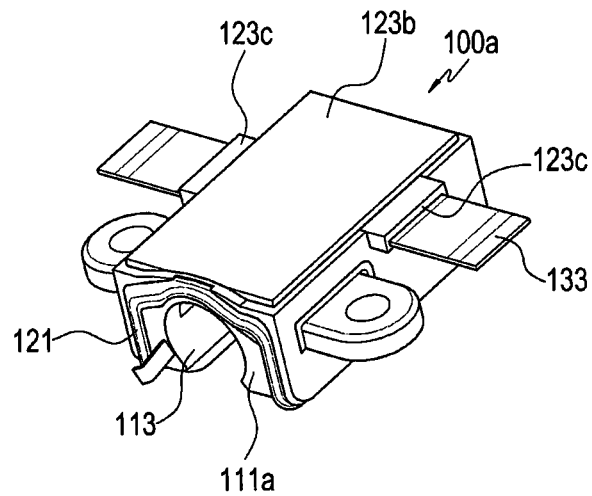
FIG. 5 is a perspective view illustrating a connection device according to an embodiment of the present disclosure.
Figure 6:
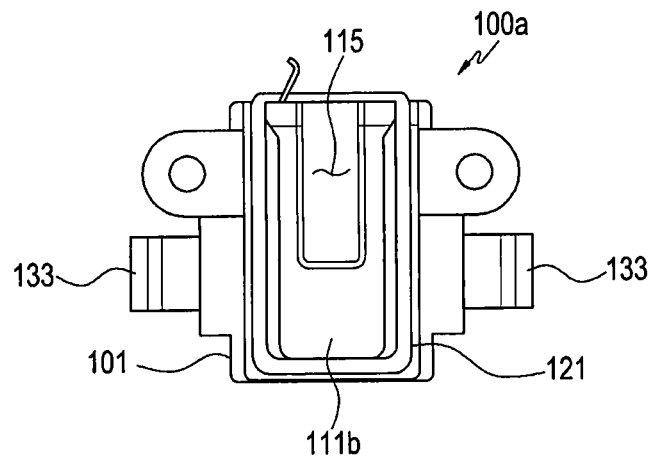
FIG. 6 is a plan view illustrating the connection device according to an embodiment of the present disclosure.
Figure 7:
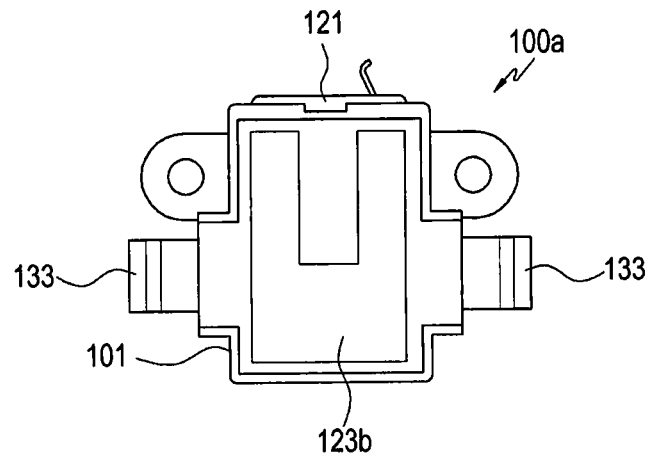
FIG. 7 is a bottom view illustrating the connection device according to an embodiment of the present disclosure.
Figure 8:
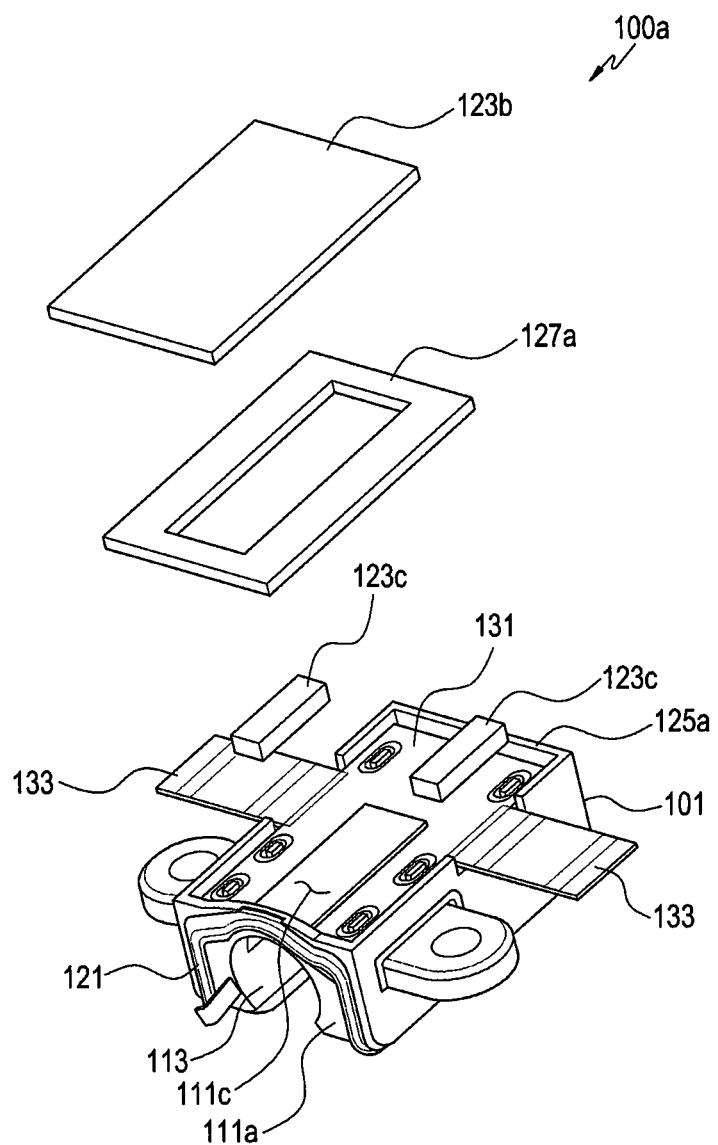
FIG. 8 is a perspective view illustrating the connection device according to an embodiment of the present disclosure in a state where the connection device is partially disassembled.

FIG. 5 is a perspective view illustrating a connection device according to an embodiment of the present disclosure. FIG. 6 is a plan view illustrating the connection device according to an embodiment of the present disclosure. FIG. 7 is a bottom view illustrating the connection device according to an embodiment of the present disclosure. FIG. 8 is a perspective view illustrating the connection device according to an embodiment of the present disclosure in a state where the connection device is partially disassembled.

According to another embodiment of the present disclosure, the connection device 100a may be different from that in the preceding embodiment in terms of the structure of arranging the sealing member 123b. In describing the connection device 100a the components that may be understood through the connection device 100 of the preceding embodiment may be denoted by the same reference numerals or the reference numerals may be omitted. In addition, the detailed descriptions thereof may also be omitted.

Referring to FIGS. 5 to 8, the connection device 100a may include a second sealing member 123b that is attached to the third face 111c of the housing 101 with a circuit board 131 interposed in between. The sealing member 123b may be implemented by a waterproof sheet in the form of a flat plate or a synthetic resin film that is made of a synthetic resin or an elastic material (e.g., rubber, silicon, urethane, and the like). The second sealing member 123b may be attached to the circuit board 131, or may be attached to the third face 111c via an adhesive member 127a, such as an adhesive or tape. The second sealing member 123b may be attached within the space that is surrounded by the side wall 125a. In another embodiment of the present disclosure, the description "the second sealing member is attached to the third face" may refer to a structure in which the adhesive member 127a attaches the second sealing member 123b to the upper end of the side wall 125a. While this embodiment provides a frame shape, the adhesive member 127a may have the form of a flat plate or a film that is the same form as the second sealing member 123b. When a portion of the side wall 125a was removed in order to wire the second circuit board 133, a third sealing member 123c may be arranged to form a dustproof and waterproof structure while closing the space for wiring the second circuit board 133. In arranging the third sealing member 123c, an adhesive member, such as an adhesive or tape, may be provided between the third sealing member 123c and the second circuit board 133, or between the third sealing member 123c and the side wall 125a.

In the above-described embodiment, the second sealing members 123a and 123b may be arranged within the space that is formed by the side wall 125a. For example, the second sealing members 123a and 123b may be formed or arranged to have a height that is the same as the side wall 125a or is lower than the side wall 125a from the third face 111c. When the second sealing members 123a and 123b are arranged within the space where the circuit board 131 is arranged, a dustproof and waterproof structure may be formed without increasing the thickness of the connection device 100 (e.g., the housing 101).

Figure 9:
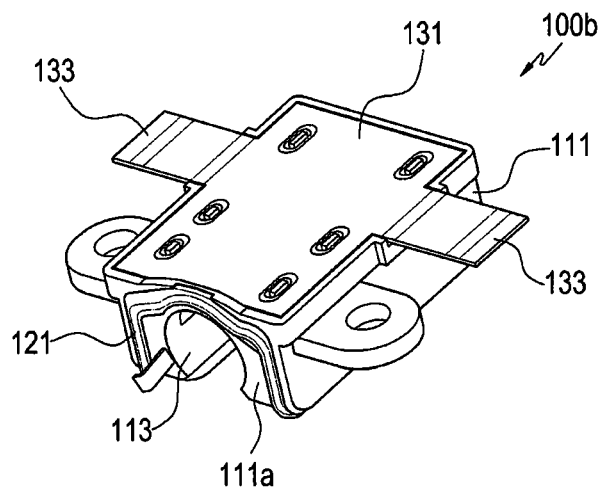
FIG. 9 is a perspective view illustrating a connection device according to an embodiment of the present disclosure.
Figure 10:
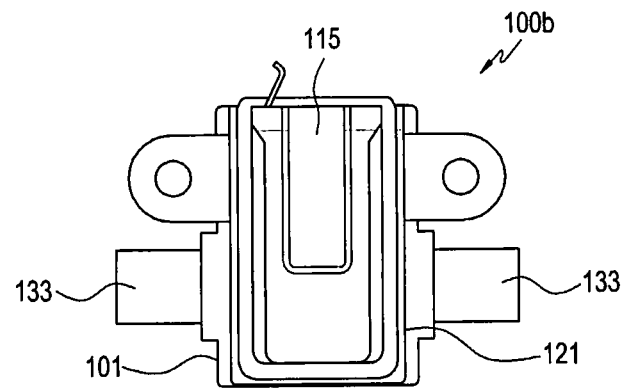
FIG. 10 is a plan view illustrating the connection device according to an embodiment of the present disclosure.
Figure 11:
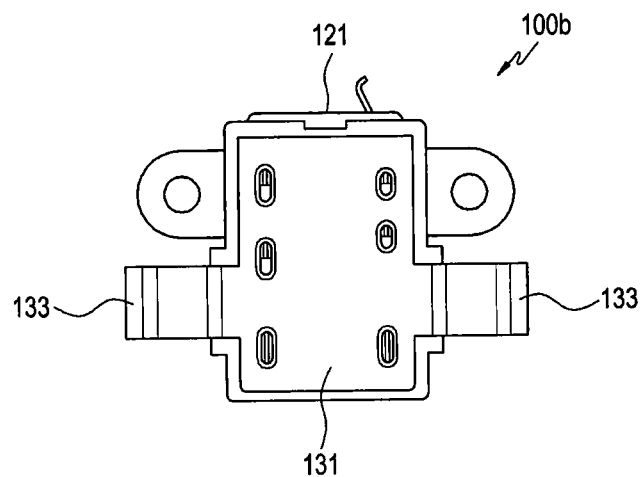
FIG. 11 is a bottom view illustrating the connection device according to an embodiment of the present disclosure.
Figure 12:
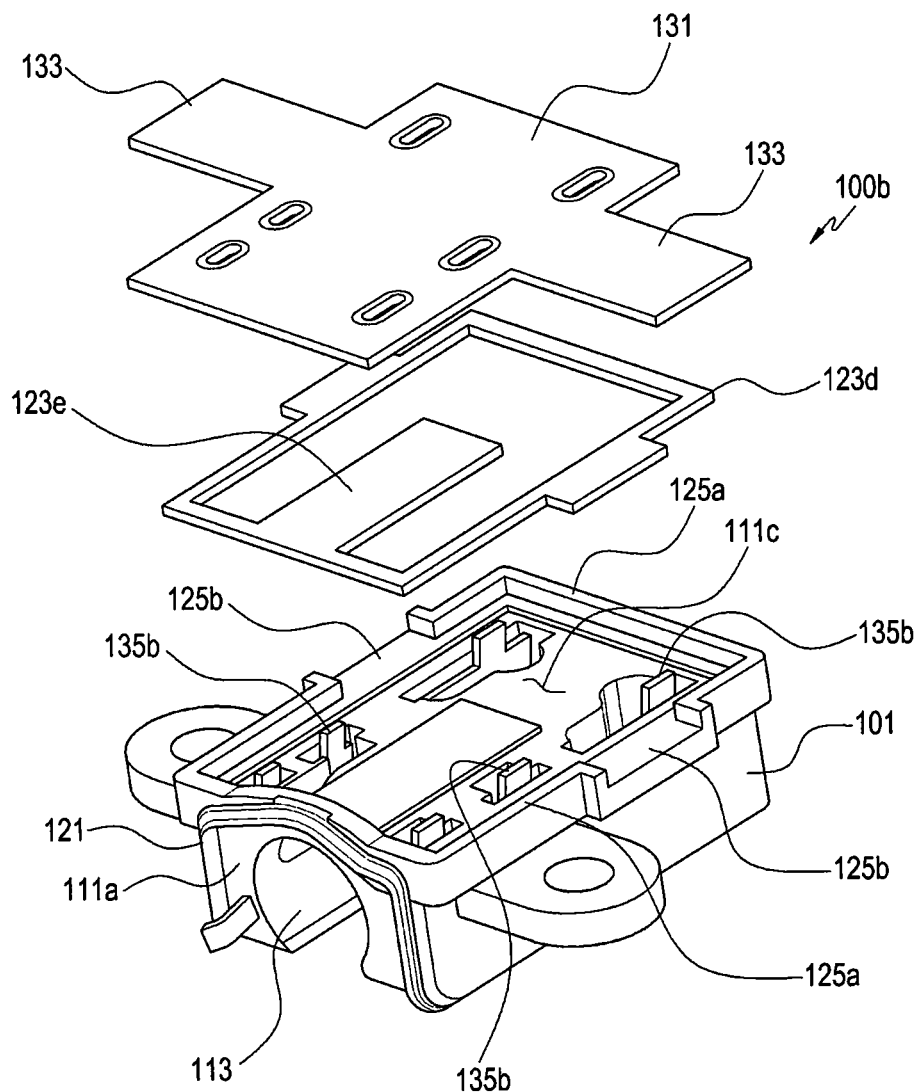
FIG. 12 is a perspective view illustrating the connection device according to an embodiment of the present disclosure in a state where the connection device is partially disassembled.

FIG. 9 is a perspective view illustrating a connection device according to an embodiment of the present disclosure. FIG. 10 is a plan view illustrating the connection device according to an embodiment of the present disclosure. FIG. 11 is a bottom view illustrating the connection device according to an embodiment of the present disclosure. FIG. 12 is a perspective view illustrating the connection device according to an embodiment of the present disclosure in a state where the connection device is partially disassembled.

The connection device 100b is capable of blocking the infiltration of water or foreign matter along a route in which connection terminals are arranged, by using the circuit board 131. In describing the connection device 100b according to this embodiment, the components that may be understood through the connection devices 100 and 100a of the preceding embodiments may be denoted by the same reference numerals or the reference numerals may be omitted. In addition, the detailed descriptions thereof may also be omitted.

Referring to FIGS. 9 and 12, in arranging the circuit board 131 on the third face 111c, an adhesive member 123d (e.g., a waterproof tape) may be interposed between the circuit board 131 and the third face 111c. The adhesive member 123d may have a frame shape that is attached to at least the peripheral edge of one face of the circuit board 131 and further, to an edge on the bottom of the third face 111c. In order to attach the circuit board 131 to the third face 111c more rigidly, the adhesive member 123d may further include a reinforcement portion 123e. For example, the entire face of the circuit board 131, except for the route in which the second ends 135b of the connection terminals reach the circuit board 131, may be attached to the third face 111c by the adhesive member 123d.

The housing 101 may include wiring recesses 125b that are formed in the side wall 125a, and the adhesive member 123d may be partially positioned in the wiring recesses 125b so as to attach and fix the second circuit board 133 to the wiring recesses 125b. The circuit board 131 may include holes that are formed to correspond to the second ends 135b of the connection terminals. The holes may be closed by solder in a surface mounting process. For example, by attaching the circuit board 131 to the third face 111c by using the adhesive member (e.g., a waterproof tape) 123d, it is possible to block water or foreign matter infiltration route, which is formed by arranging the connection terminals.

The second sealing member 123a (e.g., the above-mentioned cured resin layer) may be arranged between the circuit board 131 and the third face 111c. In addition, the second ends 135b of the connection terminals may be formed on a face that is opposite to the first face 111a, or a face that is in contact with both the first and second faces 111a and 111b. According to an embodiment of the present disclosure, the housing 101 may have a hexahedral shape, in which the portions of the outer peripheral surface of the housing 101 are referred to as a "first face," a "second face," and "third face," respectively. However, this is merely for description, and the present disclosure is not limited thereto. For example, a portion of the outer peripheral surface of the housing 101 may be formed as a curved surface, and the position where the opening 115 is formed and the position where the second ends 135b of the connection terminals are arranged may be changed according to the shape of the housing 101.

Figure 13:
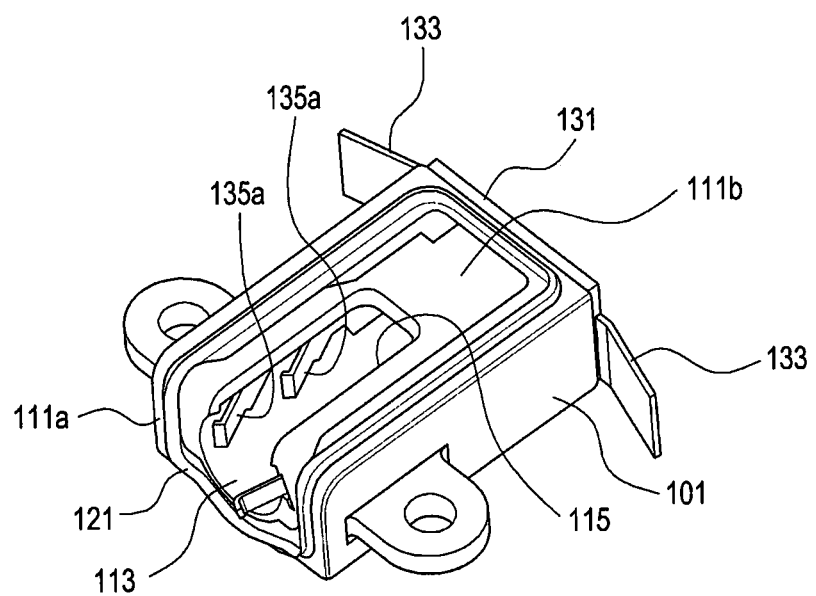
FIG. 13 is a perspective view illustrating a connection device according to an embodiment of the present disclosure.
Figure 14:
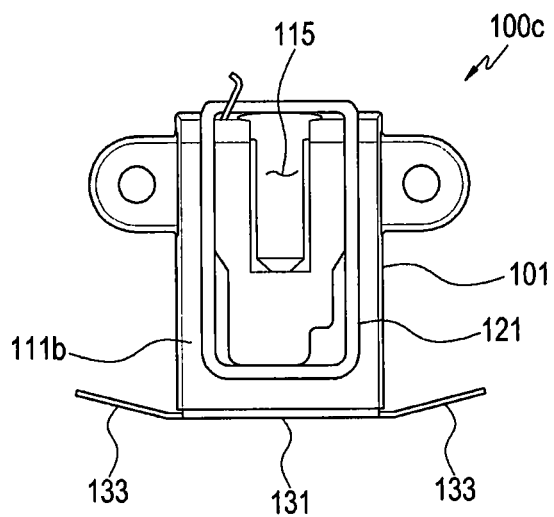
FIG. 14 is a plan view illustrating the connection device according to an embodiment of the present disclosure.
Figure 15:
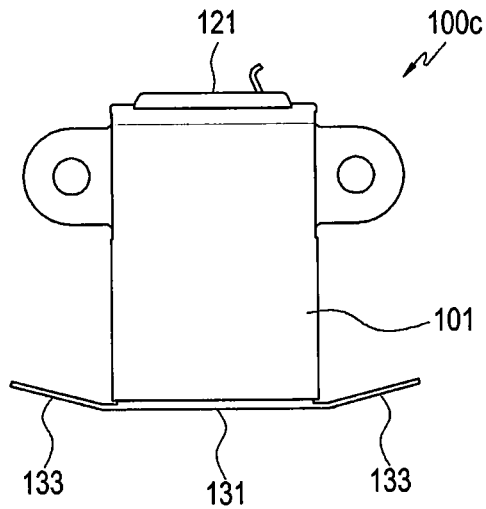
FIG. 15 is a bottom view illustrating the connection device according to an embodiment of the present disclosure.
Figure 16:
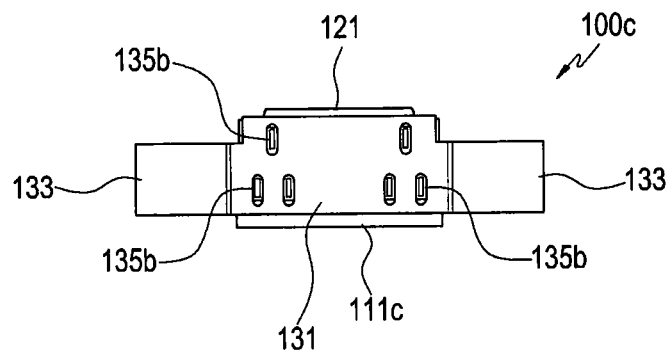
FIG. 16 is a rear view illustrating the connection device according to an embodiment of the present disclosure.
Figure 17:
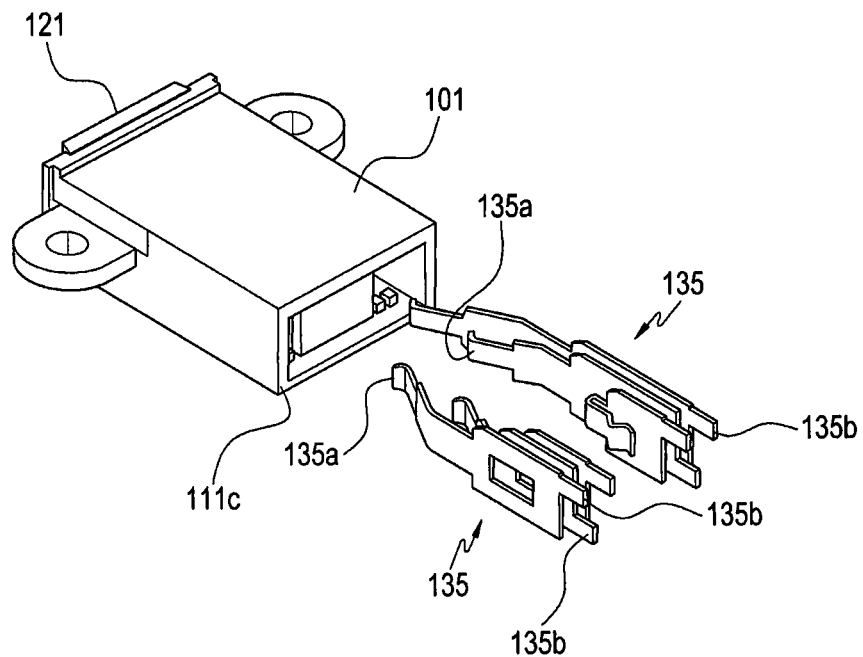
FIGS. 17 to 20 illustrate a process of manufacturing a portion of the connection device according to an embodiment of the present disclosure.
Figure 18:
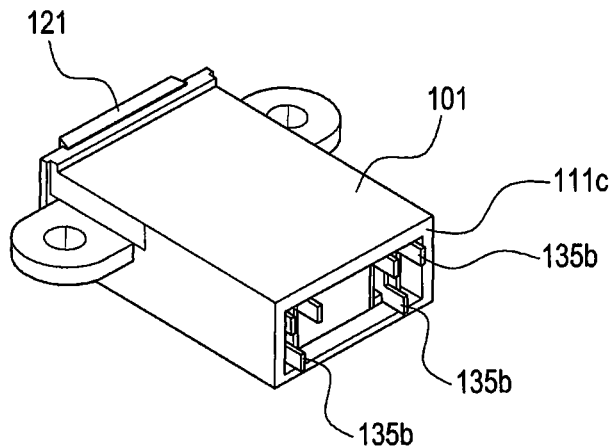

FIG. 13 is a perspective view illustrating a connection device according to an embodiment of the present disclosure. FIG. 14 is a plan view illustrating the connection device according to an embodiment of the present disclosure. FIG. 15 is a bottom view illustrating the connection device according to an embodiment of the present disclosure. FIG. 16 is a rear view illustrating the connection device according to an embodiment of the present disclosure.

Referring to FIGS. 13 to 16, the second ends 135b of the connection terminals may be arranged on the third face 111c that is opposite to the first face 111a of the housing 101. The third face 111c may be positioned to be in contact with the second face 111b of the housing 101 while being opposite to the first face 111a.

The housing 101 may include an opening 115 that is formed to extend from the second face 111b while being connected to the connection hole 113 in the first face 111a, and a sealing member 121 of a closed loop shape may be formed on or attached to the outer peripheral surface of the housing 101 to surround the region in which the opening 115 is formed. The circuit board 131 is mounted on the third face 111c so that each of the second ends 135b may be connected to the circuit board 131. As described above, the second ends 135b may be connected to the circuit board 131 by soldering. A second sealing member (a cured resin layer) 123f of FIG. 19, may be arranged between the third face 111c and the circuit board 131. The second sealing member 123f may be formed by coating a resin (e.g., epoxy) on the third face 111c, and then curing the resin before the circuit board 131 is mounted. The second sealing member 123f may be implemented by, for example, waterproof tape.

Hereinafter, a part of the process of manufacturing the connection device 100c will be described with reference to FIGS. 17 to 20.

FIGS. 17 to 20 illustrate a process of manufacturing a portion of the connection device according to an embodiment of the present disclosure.

Referring to FIGS. 17 to 20, the connection terminals 135 may be assembled to the housing 101 from the third face 111c. The housing 101 may be manufactured by injection molding, and the sealing member 121 may be formed on or attached to the outer peripheral surface of the housing 101 (e.g., the first and second faces 111a and 111b). For example, the sealing member 121 may be molded to the outer peripheral surface of the housing 101 by arranging the molded housing 101 within a mold and then, pouring a molten resin into the mold. Alternatively, a separately manufactured sealing member 121 may be attached to the housing 101 by using an adhesive or tape.

The connection terminals 135 may be assembled to the housing 101 by the number of signal lines that are arranged in an external connection device to be connected to the connection device 100c. As described above, the first ends 135a of the connection terminals 135 may protrude to the inside of the connection hole 113, and the second ends 135b may protrude to the outside of the housing 101 (e.g., the third face).

A side wall may be formed on the peripheral edge of the third face 111c. In the space that is surrounded by the side wall on the third face 111c, the second sealing member 123f (e.g., the waterproof sheet of an elastic material) may be arranged or a cured resin layer may be formed, as described above. As a result, the infiltration of water or foreign matter is blocked through the route in which the connection terminals 135 are arranged.

In the state where the second sealing member 123f is arranged or formed, the circuit board 131 may be mounted on the third face 111c to conceal the second sealing member 123f. The second ends 135b of the connection terminals 135 may protrude from the second sealing member 123f to be connected to the circuit board 131. An adhesive member may be arranged between the circuit board 131 and the third face 111c to replace the second sealing member 123f. For example, by attaching the circuit board 131 to the third face 111c by using the waterproof tape, the circuit board 131 itself may form a dustproof and waterproof structure.

Figure 21:
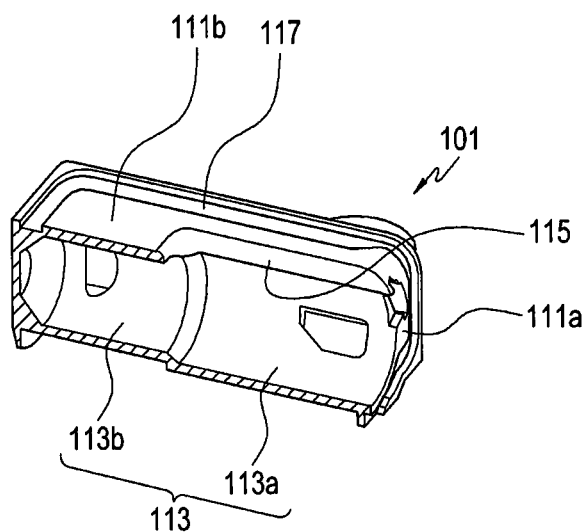
FIGS. 21 to 23 illustrate a process of forming a sealing member of a connection device according to an embodiment of the present disclosure.
Figure 22:
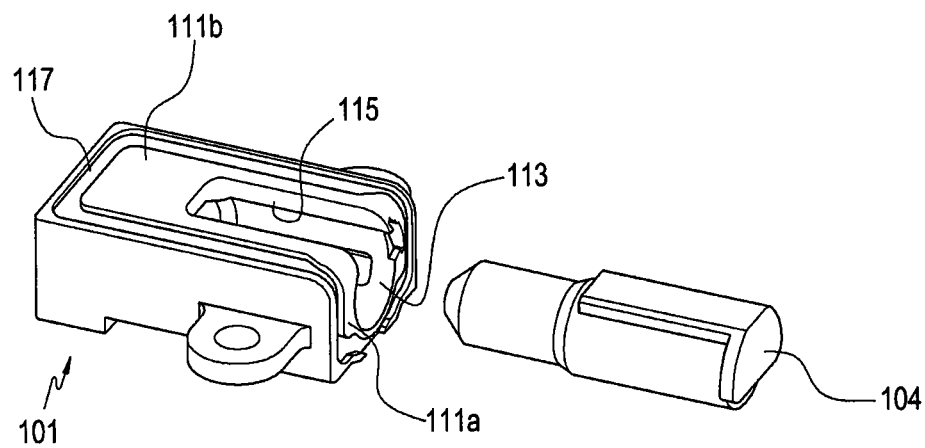
Figure 23:
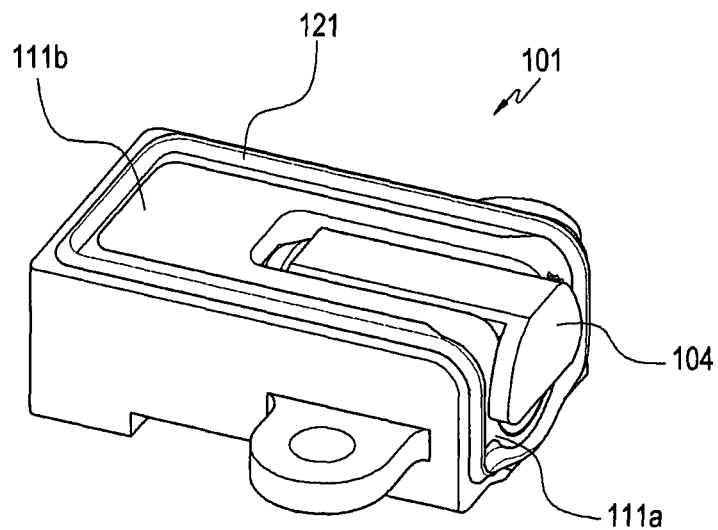
Figure 24:
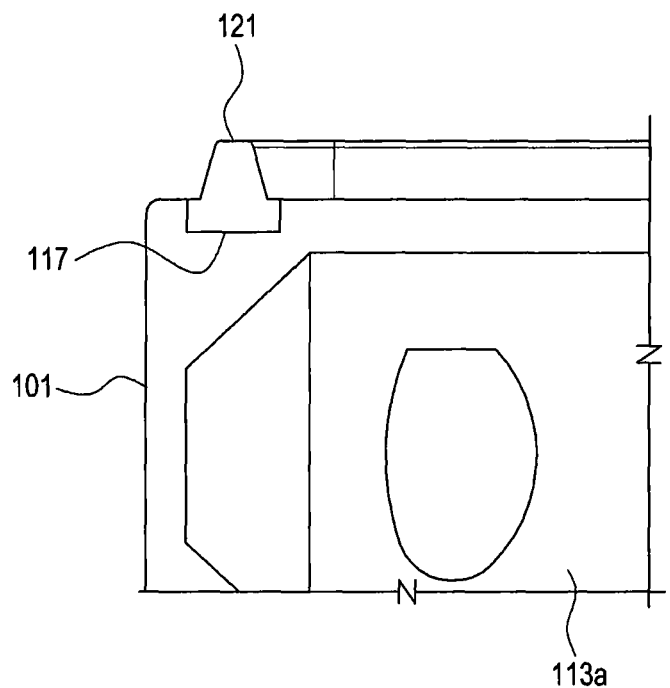
FIG. 24 is a sectional view illustrating a connection device according to an embodiment of the present disclosure in a state where a portion of the housing of the connection device is cut away.

FIGS. 21 to 23 illustrate a process of forming a sealing member of a connection device according to an embodiment of the present disclosure. FIG. 24 is a sectional view illustrating a connection device according to an embodiment of the present disclosure in a state where a portion of the housing of the connection device is cut away.

FIGS. 21 to 23 illustrate a process of forming the sealing member 121 by insert injection molding, and FIG. 24 illustrates a state in which the sealing member 121 is formed or disposed on the outer peripheral surface of the housing 101.

Referring to FIGS. 21 to 23, in forming the sealing member 121 on the outer peripheral surface of the housing 101 by insert injection molding, the housing 101 may be deformed by the pouring pressure of the molten resin for forming the sealing member 121. In manufacturing the connection device 100, the deformation of the housing 101 may be prevented by performing the insert injection molding in the state where a dummy plug 104 is coupled to the housing 101.

According to the shape of an external connection device, the shape of the connection hole 113 may also be deformed to be suitable for the shape of the external connection device. The external connection device (e.g., a plug) to be coupled to the connection device 100 may have a circular shape in cross-section, and a portion of the external connection device may have a different diameter. The connection hole 113 may have a first hole portion 113a that extends from the first face 111a, and a second hole portion 113b that extends from an end of the first hole portion 113a. The first hole portion 113a may extend from the second face 111b by the length of the opening 115, and the second hole portion 113b may have a diameter that is smaller than that of the first hole portion 113a.

In the insert injection molding process, assuming that the pouring pressure of the molten resin, which is applied to the portion where the sealing member 121 is formed, is uniform, the deformation of the housing 100 may be more likely to be caused in a relatively thin portion. For example, the portion between the second face 111b and the inner peripheral surface of the connection hole 113 may be formed to be thinner than the other portion. In the insert injection molding process, the relatively thin portion may be deformed by the pouring pressure of the molten resin. However, by inserting the dummy plug 104, the strength of the relatively thin portion may be reinforced by the dummy plug 104 in the insert injection molding process. Thus, it is possible to prevent the housing 101 from being deformed by the pouring pressure of the molten resin in the insert injection molding process.

In addition, in the insert injection molding process, the molten resin for forming the sealing member 121 may flow into a non-designed portion (e.g., the inside of the connection hole 113). This may cause a defect in the housing 101. However, by inserting the dummy plug 104 into the connection hole 113 in the process of forming the sealing member 121, it is possible to prevent the molten resin from flowing into the connection hole 113.

As described above, the sealing member 121 may be attached to the housing 101 via an adhesive member, such as an adhesive or tape, rather than being formed through insert injection molding.

Referring to FIG. 24, a portion of the sealing member 121 is accommodated in a fixing recess 117 that is formed on the outer peripheral surface of the housing 101, and another portion may protrude from the outer peripheral surface of the housing 101. In order to strengthen the attaching and fixing force between the sealing member 121 and the housing 101, a portion of the outer peripheral surface of the housing 101 (e.g., the bottom or inner walls of the fixing recess 117) may have a high surface roughness through corrosion treatment. In the portion where the sealing member 121 protrudes to the outer peripheral surface of the housing 101, the sealing member 121 may have a shape, of which the width gradually decreases in the direction away from the outer peripheral surface of the housing 101.

Figure 25:
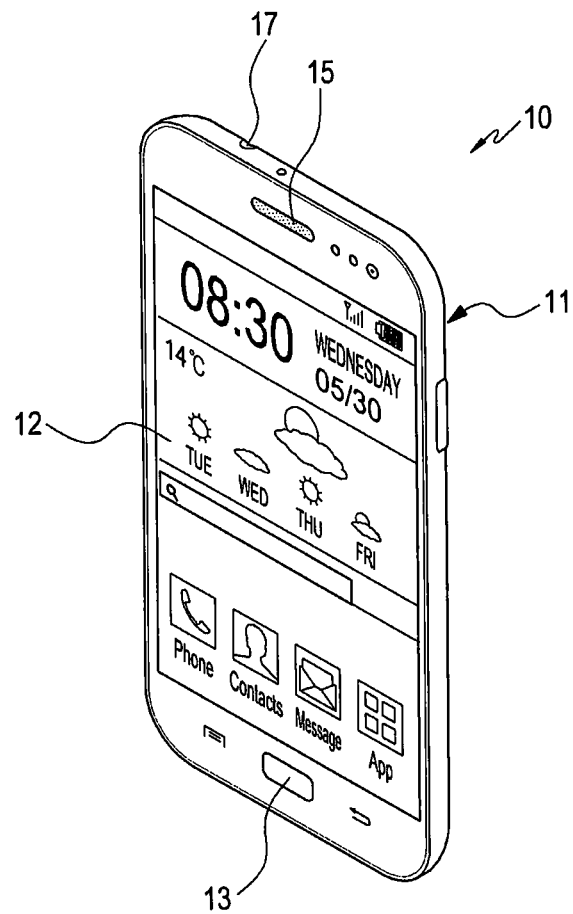
FIG. 25 is a perspective view illustrating an electronic device that includes a connection device according to an embodiment of the present disclosure.

FIG. 25 is a perspective view illustrating an electronic device 10 that includes a connection device according to an embodiment of the present disclosure.

Referring to FIG. 25, the electronic device 10 includes a case member 11 that has a front face on which a display device 12 is installed. The display device 12 may be arranged to output a screen to the front face of the case member 11 while being embedded in the case member 11. A touch panel may be incorporated in the display device 12 to implement a virtual keypad that may replace a mechanically operated keypad. A power key or a volume key may be implemented as a mechanically operated key and may be arranged on a side face or the front face of the case member.

Within the case member 11, various circuit devices may be accommodated to control the electronic device. The circuit devices, which are accommodated in the case member, may include one or more processors (e.g., an application processor (AP)), a communication module, a subscriber identification module, a memory, a sensor module, an input device, a display (e.g., the display device 12), an interface, an audio module, a camera module, a power management module, a battery, an indicator, and a motor.

A keypad 13 and/or a reception unit 15 are disposed below and above the display device 12, respectively, so as to enable the input/output of information, and for example, an illuminance sensor or a proximity sensor may be arranged around the display device 12.

The above-described connection device 100 is mounted inside the case member 11, and an insertion hole 17, which is connected to the connection device 100, may be formed in the case member 11. The insertion hole 17 may be formed on a side face of the case member 11 (e.g., the upper end face), and may provide a route that allows an external connection device (e.g., a plug that is connected to an earphone or a plug that is connected to a data cable) to be introduced into the connection hole 113 of the connection device 100.

Figure 26:
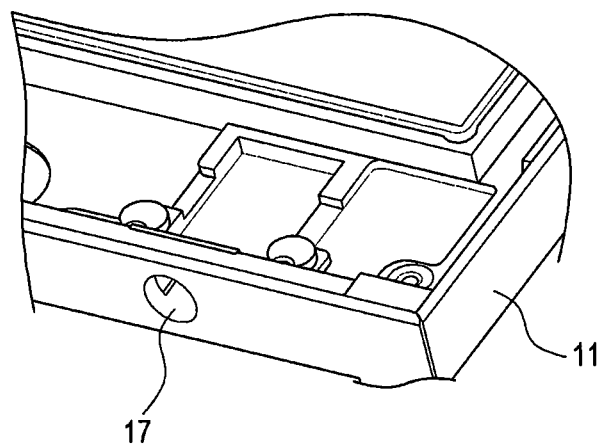
FIG. 26 is a perspective view illustrating a portion of the case member of an electronic device according to an embodiment of the present disclosure.
Figure 27:
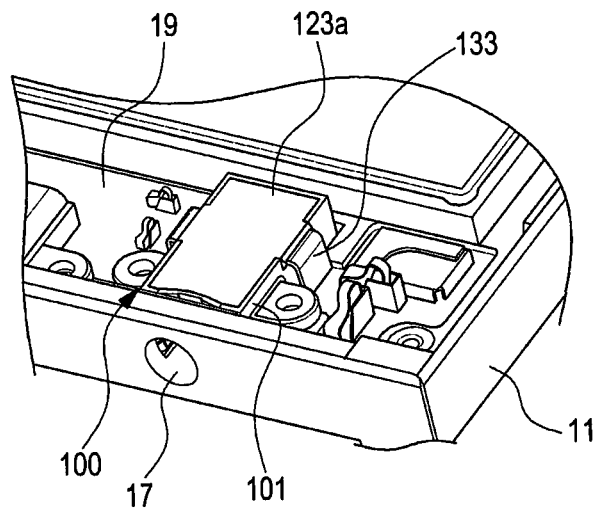
FIG. 27 is a perspective view illustrating a connection device in a state where the connection device is mounted on the case member of an electronic device according to an embodiment of the present disclosure.

FIG. 26 is a perspective view illustrating a portion of the case member of an electronic device according to an embodiment of the present. FIG. 27 is a perspective view illustrating a connection device 100 in a state where the connection device 100 is mounted on the case member of an electronic device according an embodiment of the present disclosure.

Referring to FIGS. 26 and 27, a main circuit board 19 may be disposed inside the case member 11. Within the case member 11, an auxiliary circuit board may be further arranged in addition to the main circuit board 19 in consideration of the shape of the inner space and the arrangement of circuit devices. According to an embodiment of the present disclosure, the connection device 100 is installed within the case member 11 in the state in which the connection device 100 is mounted on the main circuit board 19. However, the present disclosure is not limited thereto, and the connection device 100 may be mounted on the case member 11 or on a separate auxiliary circuit board. Some or all of the above-mentioned circuit devices may be properly arranged on the main circuit board 19, and the connection device 100 may be electrically connected to the main circuit board 19 through the second circuit board 133.

Figure 28:
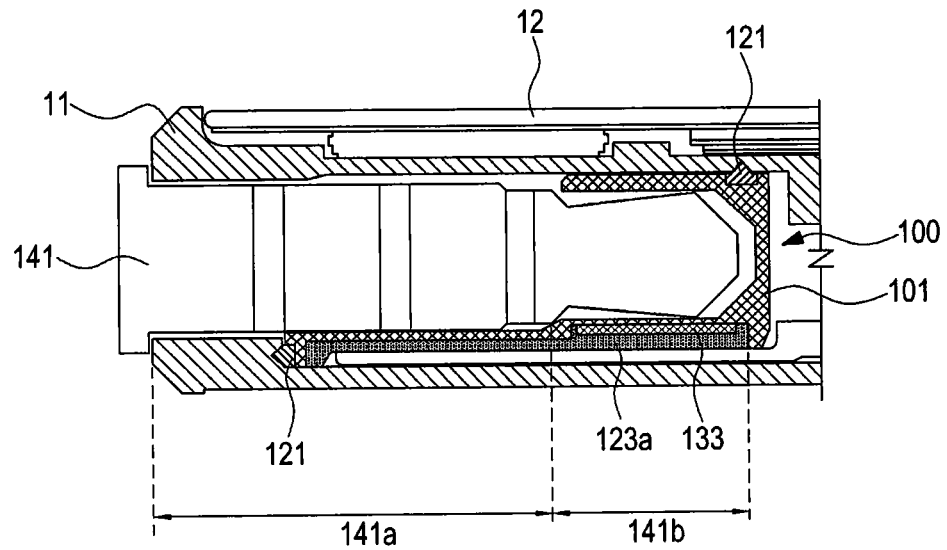
FIG. 28 is a sectional view illustrating a plug in a state where the plug is inserted into a connection device according to an embodiment of the present disclosure.
Figure 29:
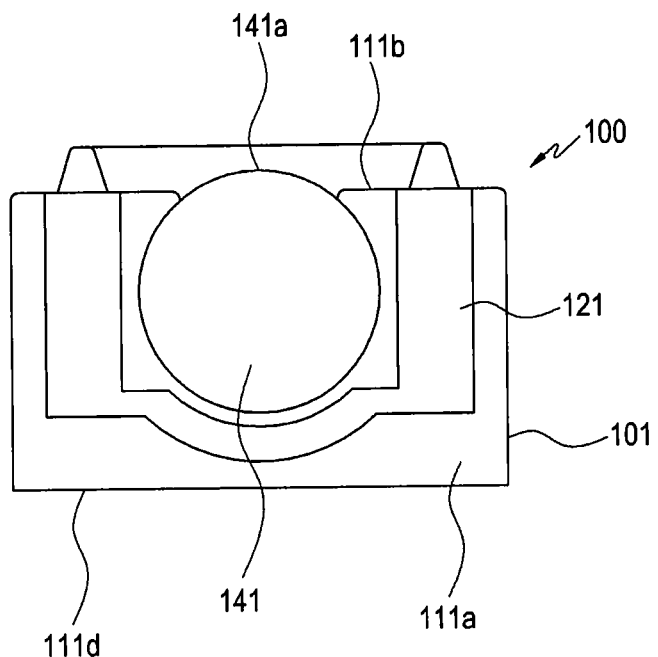
FIG. 29 is a front view illustrating the plug in a state where the plug is inserted into the connection device according to an embodiment of the present disclosure.

When the connection device 100 is installed within the case member 11, the connection hole 113 may be aligned to the insertion hole 17. FIGS. 28 and 29 illustrate a structure in which the connection device 100 is installed within the case member 11, and a state in which an external connection device (e.g., a plug) is connected to the connection device 100, respectively.

FIG. 28 is a sectional view illustrating a plug in a state where the plug is inserted into a connection device according to an embodiment of the present disclosure. FIG. 29 is a front view illustrating the plug in a state where the plug is inserted into the connection device 100 according to an embodiment of the present disclosure.

Referring to FIGS. 28 and 29, the sealing member 121 may form a dustproof and waterproof structure by being in close contact with the inner peripheral surface of the case member 11. For example, water or foreign matter, which infiltrates through, for example, the insertion hole 17, may infiltrate into the inside of the case member 11 through a gap between the inner peripheral surface of the case member 11 and the outer peripheral surface of the housing 101. The sealing member 121 may block the infiltration route of such water or foreign matter. A portion of the sealing member 121 extends into a gap between the first face 111a and the case member 11 around the region where the insertion hole 17 is formed, and the other portion of the sealing member 121 extends to the second face 111b, thereby forming a dustproof and waterproof structure between the second face 111b and the inner peripheral surface of the case member 11. Therefore, the route, which is continued to the inside of the case member 11 from the insertion hole 17 through the gap between the outer peripheral surface of the housing 101 and the inner peripheral surface of the case member 11, may be blocked by the sealing member 121.

While water or foreign matter may infiltrate into the inside of the connection hole 113, the dustproof and waterproof structure, which is formed by the second sealing member 123a, 123b, 123f or the circuit board 131 itself, may block the route through which the water or foreign matter infiltrates into the inside of the case member 11 through the connection hole 113. For example, the dustproof and waterproof structure, which is formed by the second sealing member 123a, 123b, 123f or the circuit board 131 itself, may block the infiltration of the water or foreign matter through the route in which the connection terminals 135 are arranged.

As a result, the connection device 100 may prevent water or foreign matter from infiltrating into the inside of the case member 11 of the electronic device 10 while providing a connection means of an external device.

The plug 141 may have a first portion 141a that corresponds to the first hole portion 113a and a second portion 141b that corresponds to the second hole portion 113b. For example, the first portion 141a may have a diameter that is larger than that of the second portion 141b. When the plug 141 is inserted into the connection hole 113, the first portion 141a may be positioned within the first hole portion 113a. For example, a portion of the first portion 141a may be exposed to the outside of the housing 101 through the opening 115. When the plug 141 is inserted into the connection hole 113, the second portion 141b may be inserted into the housing 101 (e.g., the second hole portion 113b of the connection hole 113) to be concealed. However, the present disclosure is not limited thereto, and the exposing or concealing structure of the plug 141 may be implemented in various ways according to the shape of the connection hole 113 or the extension length of the opening 115.

The connection device 100 may be miniaturized by reducing the thickness (or height) thereof by forming the opening 115 that partially exposes the first portion 141a. The first portion 141a may partially protrude from the outer peripheral surface (e.g., the second face 111b) of the housing 100 through the opening 115. However, the present disclosure is not limited thereto, and a portion of the first portion 141a may be positioned to be lower than the outer peripheral surface of the housing 101 (e.g., within the opening 115).

The opening 115 may also be formed in the fourth face 111d that is opposite to the second face 111b. For example, another opening, which is arranged to be symmetric to the opening 115, may be formed in the fourth face 111d, and the other portion of the first portion 141a may protrude from the fourth face 111d. By implementing the housing that has the above-described shape, the thickness of the connection device 100 may be further reduced. When the openings are formed in the second and fourth faces 111b and 111d, respectively, the sealing member 121 may have a closed loop shape that is formed from the second face 111b to the fourth face 111d via the first face 111a. In FIG. 29, the sealing member 121, which is positioned on the first face 111a, may have a shape that is similar to a "U" shape. With the structure in which the openings are formed in the second and fourth faces 111b and 111d, respectively, the sealing member 121 may be implemented in a shape that extends to be aligned to the circumference of the connection hole 113 on the first face 111a, or extends to be aligned along an edge of the first face 111a. In addition, in the structure in which the openings are formed in the second and fourth faces 111b and 111d, respectively, the second ends 135b of the connection members 135 may be arranged on the face that is opposite to the first face 111a.

By reducing the thickness of the housing 101 and forming the opening 115 as described above, it is possible to reduce the thickness of the connection device 100. The connection device 100 is arranged to be adjacent to an edge within the case member 11. Thus, the freedom of design for the exterior of the case member 11 may vary depending on the size (e.g., the thickness) of the connection device 100. For example, as the size of the connection device 100 increases, a portion of the case member 11, which accommodates the connection device 100, may also increase, and there may be difficulty in implementing a curved surface on the case member 11. A dustproof and waterproof structure may be implemented while reducing the thickness of the connection device 100. Thus, the reliability of an electronic device may be improved while improving the freedom of design in implementing the exterior of the electronic device.

As described above, according to an embodiment of the present disclosure, a connection device includes a housing that includes a first face, into which a plug is introduced, and a second face that is formed to be in contact with the first face, a connection hole that extends to the inside of the housing from the first face to accommodate the plug, an opening that extends from the first face to the second face to partially expose the connection hole on at least the second face, and a sealing member that is arranged on an outer peripheral surface of the housing to surround a region where the opening is formed.

According to an embodiment of the present disclosure, the sealing member has a closed loop shape.

According to an embodiment of the present disclosure, the plug includes a first portion and a second portion having a diameter that is smaller than that of the first portion, and in a state where the plug is inserted into the connection hole, the first portion is positioned on the opening, and the second portion is inserted into the connection hole to be concealed.

According to an embodiment of the present disclosure, a portion of the first portion protrudes to the outer peripheral surface of the housing through the opening.

According to an embodiment of the present disclosure, the connection device further includes connection terminals, each of which includes a first end that protrudes to an inner peripheral surface of the connection hole, and a second end that protrudes to the outside of the housing.

According to an embodiment of the present disclosure, the housing further includes a third face that is in contact with or is opposite to the first face or the second face, and the second ends of the connection terminals are arranged on the third face.

According to an embodiment of the present disclosure, the connection device further includes a circuit board that is coupled to face the third face. Each of the connection terminals are connected to the circuit board.

According to an embodiment of the present disclosure, the connector further includes a circuit board that is coupled to face the third face, and a second sealing member that is formed to face the third face with the circuit board being interposed therebetween. Each of the connection terminals are connected to the circuit board.

According to an embodiment of the present disclosure, the second sealing member includes a cured resin layer that is coated on the third face.

According to an embodiment of the present disclosure, the second sealing member includes a waterproof sheet that is attached to the third face.

According to an embodiment of the present disclosure, the connection device further includes a circuit board that is coupled to face the third face, and a waterproof tape that attaches the circuit board to the third face to form a waterproof structure. Each of the connection terminals are connected to the circuit board.

According to an embodiment of the present disclosure, the connection device further includes a circuit board that is coupled to face the third face, and a cured resin layer that is coated on the third face between the third face and the circuit board. Each of the connection terminals is connected to the circuit board on the cured resin layer.

According to an embodiment of the present disclosure, the third face may be arranged to be opposite to the second face while being in contact with the first face, or to be opposite to the first face while being in contact with the second face.

An electronic device according to an embodiment of the present disclosure includes the connection device as described above.

According to an embodiment of the present disclosure, the electronic device further includes a case member that accommodates the connection device, and the sealing member forms a waterproof structure between the housing and the inner peripheral surface of the case member.

According to an embodiment of the present disclosure, the electronic device further includes an insertion hole that is formed in the case member, and the connection hole is aligned to the insertion hole.

According to an embodiment of the present disclosure, a portion of the sealing member is disposed to surround a portion of a region where the insertion hole is formed on an inner peripheral surface of the case member.

Figure 30:
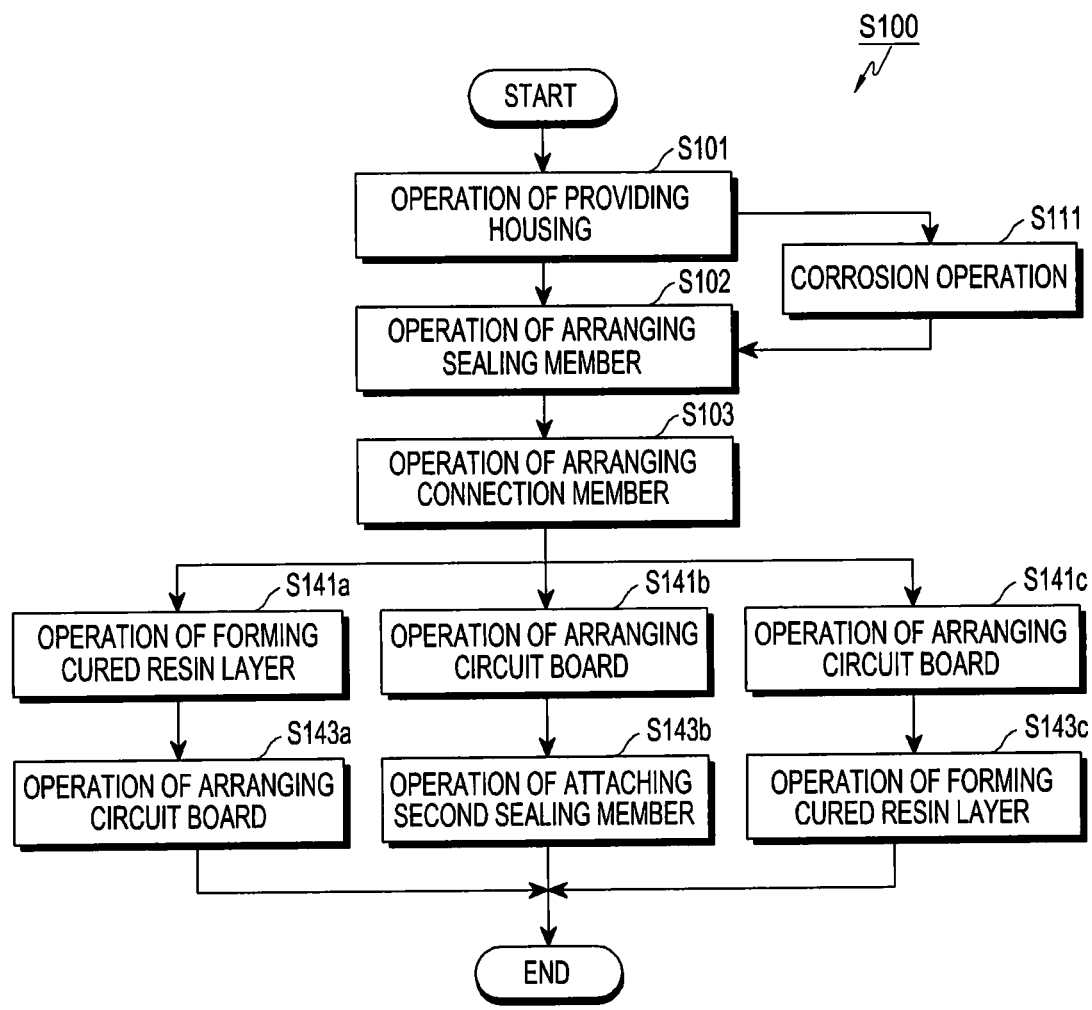
FIG. 30 is a flowchart illustrating a method of manufacturing a connection device according to an embodiment of the present disclosure.

FIG. 30 is a flowchart illustrating a method of manufacturing a connection device according to an embodiment of the present disclosure.

In describing the manufacturing method, reference may be made to the structures of the connection devices and the components thereof of the above-described embodiments.

Referring to FIG. 30, the manufacturing method S100 includes a step of providing a housing S101, and a step of arranging a sealing member S102. In addition, the manufacturing method (S100) further includes steps for forming a dustproof and waterproof structure in a route where connection members are arranged in steps S141a, S143b, and S143c while arranging the connection members and a circuit board in steps S103, S141b, and S141c.

The operation of providing the housing in step S101, refers to an operation of providing the above-mentioned housing 101, and the housing 101 may be manufactured by, for example, injection molding. When the housing 101 is provided, the operation of arranging the sealing member in step S102 is performed. If necessary, an operation of performing surface treatment (hereinafter, referred to as a "corrosion operation") on the outer peripheral surface of the housing 101 in step S111 may be performed in advance. Such surface treatment refers, for example, to performing corrosion treatment on the surface of the housing 101, and may increase the surface roughness to strengthen the attaching and fixing force between the housing 101 and the sealing member 121. On the outer peripheral surface of the housing 101, a fixing recess 117 may be formed so as to form the sealing member 121 therein, or to attach the sealing member 121 thereto. The fixing recess 117 may be formed in the operation of providing the housing in step S101 or in the corrosion operation in step S111.

In the operation of arranging the sealing member in step S102, the sealing member 121 may be formed on the outer peripheral surface of the housing 101 through an insert injection molding process. A separately manufactured sealing member 121 may be attached to the outer peripheral surface of the housing 101. When the sealing member 121 is formed through the insert injection molding process, a dummy plug 104 may be inserted into the connection hole 113 of the housing 101 in the insert injection molding process so that deformation of the housing 101 may be prevented. When the sealing member 121 is attached to the housing 101, an adhesive member, such as an adhesive or tape, may be used.

The operation of arranging the connection members in step S103 refers to an operation of assembling the connection members 135 to the housing 101, in which the first ends 135a of the connection members 135 may protrude to the connection hole 113 of the housing 101, and the second ends 135b may protrude to the outside of the housing 101. The operation of arranging the connection members in step S103 is performed after the operation of arranging the sealing member in step S102, however, the present disclosure is not limited thereto. For example, the operation of arranging the sealing member in step S102 may be performed after arranging the connection members in step S103 in advance.

After the connection members 135 are arranged, the operation of arranging circuit boards in the housing 101 in steps S141b, S141c and S143a may be performed through, for example, a surface mounting process. Before or after the operation of arranging the circuit boards in steps S141b, S141c and S143a, an operation of forming or arranging a second sealing member in steps S141a, S143b, and S143c may be performed. The order of the operations of arranging the circuit boards and the second sealing member may be properly selected according to the specification of a connection device to be manufactured or the structure of the housing 101. A specific embodiment of the present disclosure has described above an example, in which a circuit board is attached to the housing by using an adhesive member 123d of FIG. 12 (e.g., a waterproof tape) so that a dustproof and waterproof structure is formed by the circuit board itself.

Figure 19:
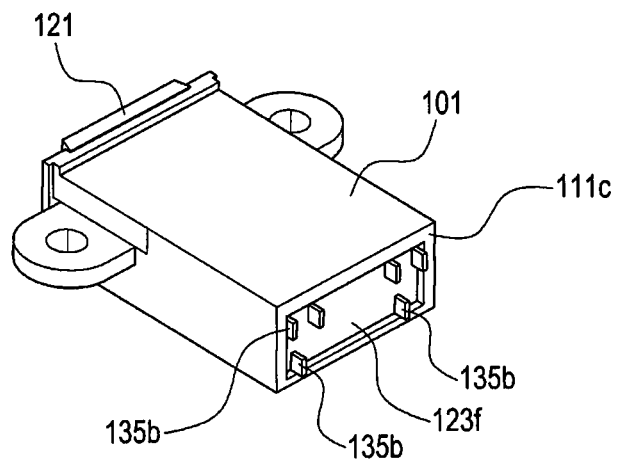
Figure 20:
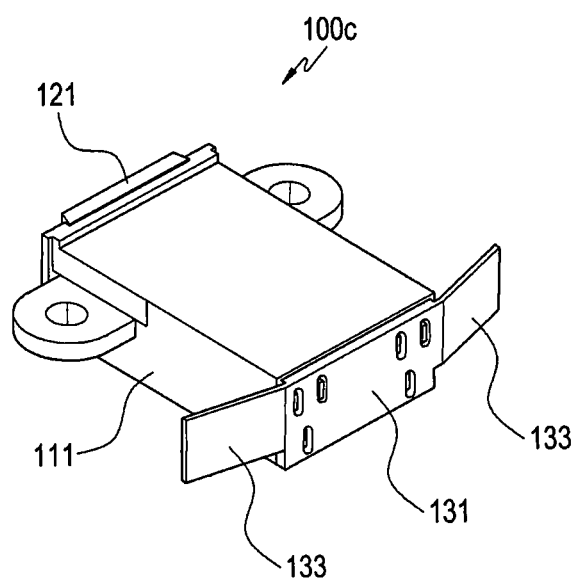

When the second sealing members 123d and 123f of FIG. 19 are formed or arranged prior to the circuit board 131, a cured resin layer may be formed by coating a resin (e.g., epoxy), on the third face 111c of the housing 101 and curing the resin in step S141a, after the connection members 135 are arranged. By forming the second sealing member 123f, which is formed of the cured resin layer, the infiltration route of water or foreign matter, which is formed by the arrangement of the connection members 135, may be blocked. After the cured resin layer is formed, the circuit board 131 may be arranged in the housing 101 in step S143a, which may be performed through a surface mounting process. In the operation of arranging the circuit board 131, each of the second ends 135b of the connection members 135 may be connected to the circuit board 131. When the circuit board 131 includes holes that are formed to accommodate the second ends 135b, the holes may be closed by, for example, soldering. In the operation of arranging the circuit board in step S143a, the circuit board 131 may be attached to the housing 101 by, for example, an adhesive or tape.

As described above, when the circuit board 131 is attached to the third face 111c of the housing 101 by using the adhesive member (e.g., a waterproof tape) 123d, the circuit board 131 itself may form a dustproof and waterproof structure. For example, the operation of forming the cured resin layer in step S141a prior to arranging the circuit board 131 may be replaced by the operation of arranging the adhesive member 123d (e.g., a waterproof tape).

According to various embodiments of the present disclosure, the second sealing member may be attached or formed in steps S143b and S143c after arranging the circuit board in advance in the housing in step S141b.

The operation of arranging the circuit board 131 in advance in the housing 101 may be performed through a surface mounting process. Through the operation of arranging the circuit board in step S143b, the circuit board 131 is arranged in the housing 101, and at the same time, the second ends 135b of the connection members 135 may be connected (e.g., soldered) to the circuit board 131.

In the state where the circuit board 131 is arranged, the operation of attaching the second sealing member in step S143b may attach the second sealing member 123b (e.g., a waterproof sheet in the form of a flat plate or a film) to the housing 101 by using, for example, the adhesive member 127a. The second sealing member 123b may be arranged to face the third face 111c with the circuit board 131 being interposed therebetween. In the operation of attaching the second sealing member 123b, an additional sealing member (e.g., the above-mentioned third sealing member 123c) may be further arranged on the third face 111c, as needed.

The operation of arranging the second sealing member after arranging the circuit board may be replaced by the operation of forming the cured resin layer in step S143c. For example, by coating and curing a resin, such as epoxy, on the third face 111c after arranging the circuit board 131 in the housing 101, a dustproof and waterproof structure may be formed while embedding the circuit board 131 on the third face 111c.

As described above, a method of manufacturing a connection device includes providing a housing that includes a first face, into which a plug is introduced, a second face that is formed to be in contact with the first face, a connection hole that extends to the inside of the housing from the first face to accommodate the plug, and an opening that extends from the first face to the second face to partially expose the connection hole on at least the second face, and arranging a sealing member on an outer peripheral surface of the housing to surround a region where the opening is formed.

According to an embodiment of the present disclosure, the arranging the sealing member include an insert injection molding operation of molding a sealing member by pouring a resin into a mold in a state where the housing is disposed in the mold, and the insert injection molding operation may be performed in a state where a dummy plug is inserted into the connection hole.

According to an embodiment of the present disclosure, arranging the sealing member includes attaching a sealing member, which is prepared separately from the housing, to the housing.

According to an embodiment of the present disclosure, the sealing member has a closed loop shape, and the method further includes causing the outer peripheral surface of the housing to be corroded along at least a trace where the sealing member is attached, prior to arranging the sealing member.

According to an embodiment of the present disclosure, the method further includes arranging connection terminals such that first ends of the connection terminals protrude to an inner peripheral surface of the connection hole, and second ends of the connection terminals protrude to the outside of the housing, and arranging a circuit board that is coupled outside the housing and is connected to the second ends of the connection terminals.

According to an embodiment of the present disclosure, the housing further includes a third face that is in contact with or is opposite to the first face or the second face, and the second ends of the connection terminals may be arranged on the third face.

According to an embodiment of the present disclosure, the method further includes forming a cured resin layer on the third face prior to arranging the circuit board, or on the third face, on which the circuit board is arranged.

According to an embodiment of the present disclosure, arranging the circuit board includes forming a waterproof structure by attaching the circuit board to the third face by using a waterproof tape.

According to an embodiment of the present disclosure, the method further includes attaching a second sealing member to the third face in a state where the circuit board is arranged on the third face such that the circuit board is interposed between the third face and the sealing member.

While the present disclosure has been shown and described with reference to certain embodiments thereof, it will be understood by those skilled in the art that various changes in form and details may be made therein without departing from the spirit and scope of the present disclosure as defined by the appended claims and their equivalents.

What is claimed is:

1. A portable electronic device, comprising:
   a case member forming at least one portion of an outer surface of the electronic device, the case member including a hole;
   a circuit board disposed at an interior side of the case member; and
   a connection device disposed adjacent to the hole at the interior side of the case member, at least one portion of the connection device electrically connected to the circuit board,
   wherein the connection device includes:
      a housing including an opening formed on a first external surface of the housing and a second external surface of the housing, a portion of the opening exposing an inner space of the connection device to outside of the portable electronic device via the hole;
      a plurality of electrical connectors disposed on an inner surface of the housing; and
      a sealing member disposed between the first external surface of the housing and an inner surface of the case member along at least a portion of a periphery of the hole.

2. The portable electronic device of claim 1, wherein the sealing member has a closed loop shape.

3. The portable electronic device of claim 1, wherein each of the plurality of electrical connectors includes a first end that protrudes to the inner space of the connection device, and a second end that protrudes to outside of the housing.

4. The portable electronic device of claim 3, wherein the housing further includes a third external surface that is in contact with, or is opposite to, the first external surface or the second external surface, and
   wherein the second ends of the electrical connectors are arranged on the third external surface.

5. The portable electronic device of claim 4, wherein the circuit board runs parallel to the third external surface, and
   wherein each of the electrical connectors is connected to the circuit board.

6. The portable electronic device of claim 1, wherein the sealing member forms a waterproof structure between the first external surface of the housing and the inner surface of the case member.

7. A portable electronic device, comprising:
   a case member forming at least one portion of an outer surface of the electronic device, the case member including a hole;
   a circuit board disposed at an interior side of the case member; and
   a connection device disposed adjacent to the hole at the interior side of the case member, at least one portion of the connection device electrically connected to the circuit board,
   wherein the connection device includes:
      a housing;
      a plurality of electrical connectors disposed on an inner surface of the housing;
      an opening formed on a first external surface of the housing and a second external surface of the housing, a portion of the opening exposing an inner space of the connection device to outside of the portable electronic device via the hole; and
      a sealing member disposed adjacent to an outer peripheral surface of the housing.

8. The portable electronic device of claim 7, wherein the sealing member has a closed loop shape.

9. The portable electronic device of claim 7, wherein the sealing member comprises:
   a first portion that runs parallel to the first external surface of the housing; and
   a second portion that runs parallel to the second external surface of the housing.

10. The portable electronic device of claim 7, wherein each of the plurality of electrical connectors includes a first end that protrudes to the inner space of the connection device, and a second end that protrudes to outside of the housing.

11. The portable electronic device of claim 10, wherein the housing comprises a third external surface that is in contact with, or is opposite to, the first external surface or the second external surface, and
   wherein the second ends of the electrical connectors are arranged on the third external surface.

12. The portable electronic device of claim 11, wherein the circuit board runs parallel to the third external surface, and
   wherein each of the electrical connectors is connected to the circuit board.

13. The portable electronic device of claim 7, wherein a plug is introduced into the first external surface of the housing via the hole.

14. A portable electronic device, comprising:
   a case member forming at least one portion of an outer surface of the electronic device, the case member including a hole;
   a circuit board disposed at an interior side of the case member; and
   a connection device disposed adjacent to the hole at the interior side of the case member, at least one portion of the connection device electrically connected to the circuit board, wherein the connection device includes:
- a housing including an opening formed on a first external surface of the housing and a second external surface of the housing, a portion of the opening exposing an inner space of the connection device to outside of the portable electronic device via the hole;
- a plurality of electrical connectors disposed on an inner surface of the housing; and
- a sealing member including a first portion that runs parallel to the first external surface of the housing, and a second portion that runs parallel to the second external surface of the housing.

15. The portable electronic device of claim 14, wherein the sealing member has a closed loop shape.

16. The portable electronic device of claim 14, wherein each of the plurality of electrical connectors includes a first end that protrudes to the inner space of the connection device, and a second end that protrudes to outside of the housing.

17. The portable electronic device of claim 16, wherein the housing further includes a third external surface that is in contact with, or is opposite to, the first external surface or the second external surface, and
wherein the second ends of the electrical connectors are arranged on the third external surface.

18. The portable electronic device of claim 17, wherein the circuit board runs parallel to the third external surface, and
wherein each of the electrical connectors is connected to the circuit board.

19. The portable electronic device of claim 17, wherein the sealing member further includes a third portion that covers a portion of the third external surface of the housing.

20. The portable electronic device of claim 14, wherein a plug is introduced into the first external surface of the housing via the hole.

* * * * *